United States Patent
Chung et al.

[11] Patent Number: 5,543,484
[45] Date of Patent: Aug. 6, 1996

[54] α-OLEFIN/PARA-ALKYLSTYRENE COPOLYMERS

[75] Inventors: T. C. Chung; H. L. Lu, both of State College, Pa.

[73] Assignee: The Penn State Research Foundation, University Park, Pa.

[21] Appl. No.: 341,778

[22] Filed: Nov. 18, 1994

[51] Int. Cl.$^6$ ............................................. C08F 212/08
[52] U.S. Cl. .................. 526/347.1; 526/158; 526/347; 526/348; 526/348.1
[58] Field of Search .................. 526/347, 347.1, 526/348.1

[56] References Cited

U.S. PATENT DOCUMENTS

| | | |
|---|---|---|
| 4,145,490 | 3/1979 | Harris, Jr. et al. . |
| 4,530,914 | 7/1985 | Ewen et al. . |
| 4,542,199 | 9/1985 | Kaminsky et al. . |
| 4,752,597 | 6/1988 | Turner . |
| 5,026,798 | 6/1991 | Canich .................. 526/127 |
| 5,169,818 | 12/1992 | Antberg .................. 502/159 |
| 5,244,996 | 9/1993 | Kawasaki .................. 526/347 |
| 5,272,236 | 12/1993 | Lai .................. 526/348.5 |
| 5,286,800 | 2/1994 | Chung et al. . |
| 5,362,824 | 11/1994 | Furtek .................. 526/114 |
| 5,378,672 | 1/1995 | Shamshoum .................. 502/108 |

OTHER PUBLICATIONS

Ford, et al. Macromolecules, 19, 2470, 1986.
Stover, et al. Macromolecules, 24, 6340, 1991.
Seppala, et al. Macromolecules, 27, 3136, 1994.
Tsuruta, et al. Makromol. Chem. Rapid Commun. 7, 437, 1986.
Soga, et al. Macromolecules, 22, 2875, 1989.
Salvadori, et al. Macromolecules, 20, 58, 1987.
Roggero, et al. Polymer International, 30, 93, 1993.
Jones, et al. Polymer, 31, 1519, 1990.
Frechet in "Crown Ethers and Phase Transfer Catalysts in Polymer Science" edited by Matthews and Canecher and published by Plenum Press, NY, 1984.
Montheard, et al. Rev. Macromol. Chem. Phys. C–28, 503, 1988.

*Primary Examiner*—Fred Zitomer
*Attorney, Agent, or Firm*—Thomas J. Monahan

[57] ABSTRACT

Copolymers comprising poly(α-olefin) having at least few p-alkylstyrene (para-alkylstyrene) groups or/and p-alkylstyrene derivatives within the structure therein, said polymer having monomer units represented by the structural formula:

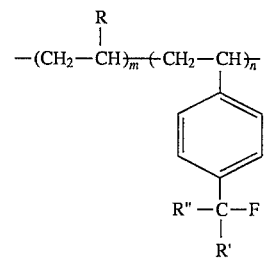

in which R, R' and R" are, independently, either hydrogen, alkyl, or primary or secondary alkyls. Preferably, R is hydrogen and $C_1$ to $C_{10}$ linear and branched alkyl, and most preferably R is hydrogen, $C_1$ and $C_2$. R' and R" are hydrogen, $C_1$ to $C_5$ alkyl, or $C_1$ to $C_5$ primary or secondary alkyl, and most preferably R' and R" are hydrogen. F comprises a hydrogen or a functional group, such as —COOH, —OH, —NH$_2$, —Cl, —Br, —M, —COOM (M=metals, e.g. Li, Na, K and Ca) etc., or a mixture of functional group and hydrogen. In the copolymer composition, the α-olefin mole % (m) is between about 5 and 99.9. Preferably, m is between 85 and 99.9, and most preferably m is between 95 and 99.9. The sum of m and n (mole % of p-alkylstyrene) is 100. The copolymer having a number average molecular weight (Mn) of at least about 1,000, and preferably at least about 10,000. The copolymers also preferably have a ratio of weight average molecular weight (Mw) to number average molecular weight, or Mw/Mn of less than about 8, more preferably less than about 4, most preferably less than about 2.5.

Also disclosed are polymerization process, involving transition metal catalysts (especially metallocene compounds with constrained ligand geometry) for producing α-olefin/p-alkylstyrene copolymers, and subsequently derivatization processes for producing functionalized copolymers of α-olefin and p-alkylstyrene by the functionalization of benzylic protons in p-alkylstyrene units of copolymer.

5 Claims, No Drawings

α-OLEFIN/PARA-ALKYLSTYRENE COPOLYMERS

FIELD OF THE INVENTION

The present invention relates to copolymers of α-olefin and p-alkylstyrene (para-alkylstyrene), ranging from amorphous, glassy poly(p-alkylstyrene)-like polymers to highly crystalline, tough, high density polyethylene-like polymers. The copolymer of α-olefin and p-alkylstyrene is very useful by itself and is also a very versatile intermediate for conversion to functionalized polyolefin with various functional groups, such as —COOH, —OH, —NH$_2$, —Cl, —Br, —M, —COOM (M=metals, e.g. Li, Na, K and Ca) etc. More particularly, the present invention relates to methods, involving transition metal catalysts (especially metallocene compounds with constrained ligand geometry), for producing α-olefin/p-alkylstyrene copolymers with good comonomer incorporation and controllable molecular structure. Still more particularly, the present invention relates to methods for producing functionalized copolymers of α-olefin and p-alkylstyrene by the functionalization of benzylic protons in p-alkylstyrene units of copolymer.

BACKGROUND OF THE INVENTION

The copolymerization of styrene and α-olefins is usually very difficult in the direct copolymerization processes using Ziegler-Natta catalysts (see Seppala et al. Macromolecules 27, 3136, 1994 and Soga et al. Macromolecules, 22, 2875, 1989). Especially involving stereospecific heterogeneous catalysts, the reactivity of monomer is sterically controlled, the larger the size the lower the reactivity. Only very few % of styrene has been randomly incorporated in polyethylene (HDPE) and isotactic polypropylene (i-PP) in the butch reactions. By using several low reactive metal oxide catalysts and under very inconvenient "living" polymerization conditions, the combination of Ziegler-Natta polymerization and transformation reactions were reported to produce some α-olefin/styrene diblock copolymers (see Doi et al. "Coordination Polymerization", edited by Price and Vandenberg, Plenum Press, 1983 and Akiji et al. JP 04,130,114).

On the other hand, the copolymerization of styrene (styrene derivatives) and isobutylene with cationic catalysts is known in the art (see Harris et al. U.S. Pat. No. 4,145,190 and Macromolecules, 19, 2903, 1986). Under cationic polymerization conditions, p-alkylstyrene and isobutylene have been copolymerized rather readily to yield the copolymers covering the entire compositional range. Thus, such copolymers ranging from tough, glassy high poly(p-alkylstyrene) content copolymers for use in plastic blends, to rubbery p-alkylstyrene incorporated isobutylene copolymers. Furthermore, the copolymers have been used in a variety of applications, including use as adhesives in connection with other materials taking advantage of the surface characteristics of the polyisobutylene sequences, as coatings, as asphalt blends, and in various plastic blends.

The interest of incorporating p-alkylstyrene in polymer is due to its versatility to access a broad range of functional groups. The benzylic protons are ready for many chemical reactions which introduce functional groups at benzylic position under mild reaction conditions. The oxidation of alkylbenzene to carboxylic acids has been widely studied (see Onopchenkov et al. J. Org. Chem. 37, 1414, 1972 and Stover et al. Macromolecules, 24, 6340, 1991). The halogenation of benzylic systems is also a well-established chemistry (see Ford et al. Macromolecules, 19, 2470, 1986; Salvadori et al. Macromolecules, 20, 58, 1987; Jones et al. Polymer, 31, 1519, 1990). Some reports have also shown the effective metallation reactions to form benzylic anion in alkylbenzene species (see Makromol. Chem., Rapid Commun. 7, 437, 1986 and Roggero et al. Polymer International, 30, 93, 1993). In addition, the further conversion of the halogenated and metallated products significantly broaden the scope of functional groups in polymers to almost all the desirable organic functional groups. The benzylic halogen functionality constitutes a very active electrophile that can be converted to many other functionalities via nucleophilic substitution reactions. This functionalization route has long been recognized and the chemical literature is replete with examples of these reactions. "Clean" conversions in high yield to many functionalities, including the following have been reported: aldehyde carboxy, amide, ether, ester, thioester, thioether, alkoxy, cyanomethyl, hydroxymethyl, thiomethyl, aminomethyl, cationic ionomers (quaternary ammonium or phosphonium, s-isothiouronium, or sufonium salts), anionic ionomers (sulfonate and carboxylate salts), etc. In addition, the literature describes many examples in which a benzylic halogen is replaced by a cluster of other functionalities by nucleophilic substitution with a multifunctional nucleophile such as: triethanol amine, ethylene polyamines, malonates, etc. Nearly all of this previous work has been with simple, small (i.e. nonpolymeric) molecules containing the aromatic halomethyl (or benzylic) functionality. However, a considerable amount of art also exists on nucleophilic substitution reactions involving chloromethyl styrene and polystyrenes containing aromatic chloromethyl groups to introduce other functionalities. Much of this work involves reactions with "styragels", or lightly cross-linked polystyrenes containing various amounts of benzylic chlorine (see Camps et al. Macromol. Chem. Physics, C22(3), 343, 1982–83, Montheard, et al. Rev. Macromol. Chem. Phys., C-28,503, 1988 and JMJ Frechet in "Crown Ethers and Phase Transfer Catalysts in Polymer Science", edited by Matthews and Canecher and Published by Plenum Press, NY, 1984).

It is well-known that most of polyolefins are produced by coordination polymerization using transition metal catalysts, commonly known as Ziegler-Natta catalysts (see J. Boor, Jr., Ziegler-Natta Catalysts and Polymerizations; Academic Press: New York, 1979). In recent years, the new developments in metallocene homogeneous catalysts (see Kaminsky et al. U.S. Pat. No. 4,542,199, Ewen et al. U.S. Pat. No. 4,530,914, Slaugh et al. U.S. Pat. No. 4,665,047, Turner U.S. Pat. No. 4,752,597, Canich et at. U.S. Pat. No. 5.026,798 and Lai et at. U.S. Pat. No. 5,272,236) provide a new era in polyolefin synthesis. With well-defined (single-site) catalyst, the monomer insertion can be effectively controlled. The reaction is especially important for the copolymerization reactions. Several prior disclosures have shown the use of metallocene catalysts with constrained ligand geometry producing linear low density polyethylene (LLDPE) with narrow composition distribution and narrow molecular weight distribution. The relatively opened active site in metallocene catalyst provides the equal access for both comonomers. The incorporation of high olefin comonomer is significantly higher than those obtained from traditional Ziegler-Natta catalysts. In addition, the prior art has identified the cationic coordination mechanism responsible for the polymerization reaction in the single site catalysts. Both cationic active site insertion mechanism and effective copolymerization of comonomers are very important and favorable for the incorporation of para-alkylstyrene in polyolefins.

Although useful in many commercial applications, polyolefins, such as high density polyethylene (HDPE) and isotactic polypropylene (i-PP), suffer a major deficiency, poor interaction with other materials. The inert nature of polyolefins significantly limits their end uses, particularly, those in which adhesion, dyeability, paintability, printability or compatibility with other functional polymers is paramount. Unfortunately, polyolefins have been the most difficult materials in chemical modifications, both in functionalization and graft reactions. In post-polymerization, the inert nature and crystallinity of the polymer usually render it difficult to chemically modify the polymer under mild reaction conditions. In many cases, the reaction involves serious side reactions, such as degradation in the polypropylene modification reaction. In the direct polymerization, only a Ziegler-Natta process can be used in the preparation of linear polyolefins. It is normally difficult to incorporate the functional group-containing monomers into the polyolefins by Ziegler-Natta catalysts due to the catalyst poisons (see J. Boor, Jr., Ziegler-Natta Catalysts and Polymerizations; Academic Press: New York, 1979). Our previous inventions (see Chung et at. U.S. Pat. Nos. 4,734,472; 4,751,276; 4,812,529; 4,877,846) have taught the uses of borane-containing polyolefins. The chemistry involves the direct polymerization by using organoborane-substituted monomers and α-olefins in Ziegler-Natta processes. The homo- and copolymers containing borane groups are very useful intermediates to prepare a series of functionalized polyolefins. Many new functionalized polyolefins with various molecular architectures have been obtained based on this chemistry. In addition, it has been demonstrated that the polar groups can improve the adhesion of polyolefin to many substrates, such as metals and glass (see Chung et al, J. Thermoplastic Composite Materials 6, 18, 1993 and Polymer, 35, 2980, 1994). The chemistry of borane containing polymers has also been extended to the preparation of polyolefin graft copolymers, which involves free radical graft-from reaction (see Chung et at, U.S. Pat. No. 5,286,800, 1994). In polymer blends, the incompatible polymers can be improved by adding a suitable polyolefin graft copolymer which reduces the domain sizes and increases the interfacial interaction between domains (see Chung et al, Macromolecules 26, 3467, 1993; Macromolecules, 27, 1313, 1994).

SUMMARY OF THE INVENTION

In accordance with the present invention applicants have discovered another class of copolymers which are versatile in the interconversion to functional polymers. The copolymers comprising the direct reaction product of α-olefin having from 2 to 12 carbon atoms and p-alkylstyrene (para-alkylstyrene) in which the copolymer has a substantially homogeneous compositional distribution. The copolymer formula is illustrated below:

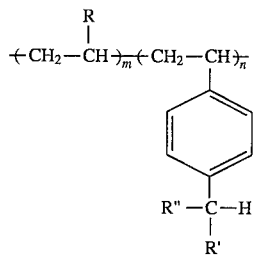

(I)

in which R, R' and R" are independently, either hydrogen, alkyl, or primary or secondary alkyls. Preferably, R is hydrogen and $C_1$ to $C_{10}$ linear and branched alkyl, and most preferably R is hydrogen, $C_1$ and $C_2$. R' and R" are hydrogen, $C_1$ to $C_5$ alkyl, or $C_1$ to $C_5$ primary or secondary alkyl, and most preferably R' and R" are hydrogen. In the copolymer composition, the α-olefin mole % (m) is between about 5 and 99.9. Preferably, m is between 85 and 99.9, and most preferably m is between 95 and 99.9. The sum of m and n (mole % of para-alkylstyrene) is 100. The copolymer having a number average molecular weight (Mn) of at least about 1,000, and preferably at least about 10,000. The copolymers also preferably have a ratio of weight average molecular weight (Mw) to number average molecular weight, or Mw/Mn of less than about 8. more preferably less than about 4, most preferably less than about 2.5.

In accordance with another aspect of the present invention, applicants have also discovered a process for producing a copolymer (I) of α-olefin having from 2 to 12 carbon atoms and para-alkylstyrene in which the copolymer has a substantially homogeneous compositional distribution. The catalysts preferably employed in the production are single-site metallocene catalysts, which have a constrained ligand geometry and a relatively opened active site available for the insertion of both α-olefin and the p-alkylstyrene monomers. In addition, the cationic nature of active site provides favorable condition for the insertion of p-alkylstyrene. In fact, the reactivity of p-methylstyrene is significantly higher than that of styrene. Preferred catalyst complexes include Zirconocene and Titanocene compounds with single or double cyclopentadienyl derivatives which form the constrained ligand geometry. The catalyst further comprises an activating cocatalyst which usually is a Bronsted acid salt with noncoordinating anion. By mixing α-olefin and p-alkylstyrene monomers in a reactor with the presence of a diluent and metallocene catalyst, the copolymerization will take place under the inert atmosphere conditions. The copolymerization can be terminated after a certain reaction time by addition of isopropanol to destroy the active metal species. These copolymers were isolated from solution by simple filtration and then washed repeatedly with isopropanol.

In accordance with another embodiment of the present invention, applicants have also discovered functionalized copolymers of α-olefin having from 2 to 12 carbon atoms and p-alkylstyrene in which the copolymers have a substantially homogeneous compositional distribution. The formula of functionalized copolymers is illustrated below:

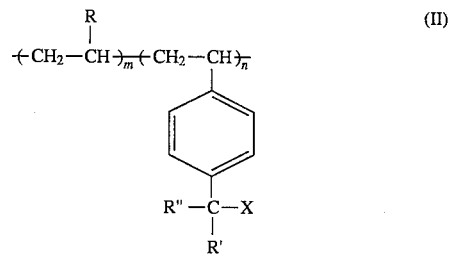

(II)

in which R, R' and R" are, independently, either hydrogen, alkyl, or primary or secondary alkyls. Preferably, R is hydrogen and $C_1$ to $C_{10}$ linear and branched alkyl, and most preferably R is hydrogen, $C_1$ and $C_2$. R' and R" are hydrogen, $C_1$ to $C_5$ alkyl, or $C_1$ to $C_5$ primary or secondary alkyl, and most preferably R' and R" are hydrogen. X comprises a functional group, such as —COOH, —OH, —NH$_2$, —C$_1$, —Br, —M, —COOM (M=metals, e.g. Li, Na, K and Ca) etc. or a mixture of functional group and hydrogen. Preferably these functionalized copolymers are otherwise substantially free of any functional group on the polymer backbone chain (i.e., on the α-olefin carbons). In a highly preferred embodiment the halogen is bromide. In the copolymer composition, the α-olefin mole % (m) is between about 5 and 99.9. Preferably, m is between 85 and 99.9, and most preferably m is between 95 and 99.9. The sum of m and n (mole % of para-alkylstyrene) is 100. The copolymer having a number average molecular weight (Mn) of at least about 1,000, and preferably at least about 10,000. The copolymers also preferably have a ratio of weight average molecular weight (Mw) to number average molecular weight, or Mw/Mn of less than about 8, more preferably less than about 4, most preferably less than about 2.5.

DETAILED DESCRIPTION OF THE INVENTION

This invention is initially based upon the discovery that an effective copolymerization reaction of α-olefin and p-alkylstyrene will take place under some transition metal catalyst conditions. Especially, the use of metallocene catalysts with contrained ligand geometry offer unexpectedly high comonomer reactivity. This type copolymerization reaction now permits one to produce copolymers which comprise the direct reaction product with uniform copolymer compositional distributions and high comonomer incorporations. The copolymer of α-olefin and p-alkylstyrene is very useful material by itself and is also a versatile intermediate compound for the interconversion to functionalized polyolefins with various functional groups and functional group concentrations.

The copolymers comprising the direct reaction product of α-olefin having from 2 to 12 carbon atoms and p-alkylstyrene in which the copolymer has a substantially homogeneous compositional distribution. The copolymer formula is illustrated below:

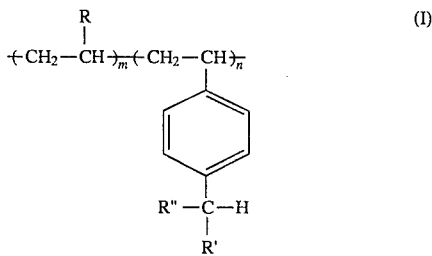

in which R, R' and R" are, independently, either hydrogen, alkyl, or primary or secondary alkyls. Preferably, R is hydrogen and $C_1$ to $C_{10}$ linear and branched alkyl, and most preferably R is hydrogen, $C_1$ and $C_2$. Preferably, R' and R" are hydrogen, $C_1$ to $C_5$ alkyl, or $C_1$ to $C_5$ primary or secondary alkyl, and most preferably R' and R" are hydrogen. With respect to the ratio of the monomers employed to produce these copolymers it is a distinct advantage of the present invention that a very wide range of the ratio of the monomers in the copolymer product can be achieved in accordance with this invention. In the copolymer composition, the α-olefin mole % (m) is between about 5 and 99.9. Preferably, m is between 85 and 99.9, and most preferably m is between 95 and 99.9. The sum of m and n (mole % of para-alkylstyrene) is 100. These copolymers, as determined by gel permeation chromatography (GPC) and differential scanning calorimetry (DSC) demonstrate narrow molecular weight distributions and substantially homogeneous compositional distributions or compositional uniformity over the entire range of compositions thereof. The copolymers have high molecular weights, and in particular having a number average molecular weight (Mn) of at least about 1,000, and preferably at least about 10,000. In addition, these products also exhibit a relatively narrow molecular weight distribution. In particular, these copolymers thus exhibit a ratio of weight average molecular weight (Mw) to number average molecular weight, or Mw/Mn value, of less than about 8, preferably less than about 4, more preferably less than about 2.5.

The general process for producing the α-olefin and p-alkylstyrene copolymers of this invention is illustrated below:

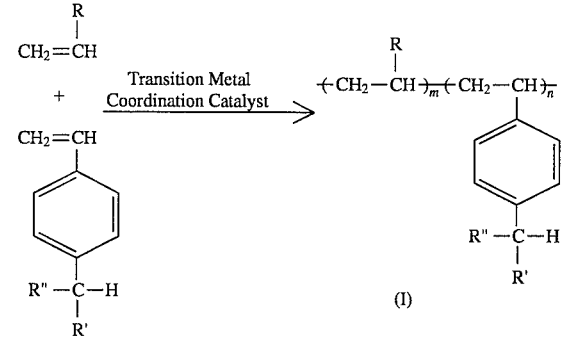

in which R, R' and R" are, independently, either hydrogen, alkyl, or primary or secondary alkyls. Preferably, R is hydrogen and $C_1$ to $C_{10}$ linear and branched alkyl, and most preferably R is hydrogen, $C_1$ and $C_2$. R' and R" are hydrogen, $C_1$ to $C_5$ alkyl, or $C_1$ to $C_5$ primary or secondary alkyl, and most preferably R' and R" are hydrogen. In the copolymer composition, the α-olefin mole % (m) is between about 5 and 99.9. Preferably, m is between 85 and 99.9, and most preferably m is between 95 and 99.9. The sum of m and n (mole % of p-alkylstyrene) is 100. The copolymers have high molecular weighs, and in particular having a number average molecular weight (Mn) of at least about 1,000, and preferably at least about 10,000.

As expected, the copolymerization of α-olefin and p-alkylstyrene (such as p-methylstyrene) by using traditional Ziegler-Natta catalyst is not very effective. Only very low % of p-methylstyrene can be incorporated into polyolefin structures. Usually, the copolymerization reaction takes place by mixing α-olefin and p-alkylstyrene monomers in a reactor with the presence of a diluent and Ziegler-Natta catalyst under the inert atmosphere conditions. The polymer solution is very dependent on the α-olefin that is used. For example, when 1-octene is used, is a homogeneous solution is observed through the whole copolymerization reaction. On the other hand, almost immediately, white precipitate could be seen when ethylene and propylene are used.

On the other hand, α-olefin and p-alkylstyrene are readily copolymerized with single-site metallocene catalysts. The cationic coordination copolymerization of the p-alkylstyrene (especially p-methylstyrene) and α-olefin is very effective in producing the products with a relatively narrow composition distribution and narrow molecular weight distribution. In particular, these copolymers thus exhibit a ratio of weight average molecular weight (Mw) to number average molecular weight, or Mw/Mn value, of less than about 8, preferably less than about 4, more preferably less than about 2.5. The copolymers have high molecular weights, and in particular having a number average molecular weight (Mn) of at least about 1,000, and preferably at least about 10,000. The α-olefin mole % (m) is between about 5 and 99.9. Preferably, m is between 85 and 99.9, and most preferably m is between 95 and 99.9. The sum of m and n (mole % of p-alkylstyrene) is 100. The cationic nature of active site and constrained ligand geometry of metallocene catalyst provides favorable condition for the insertion of p-alkylstyrene. In fact, the reactivity of p-methylstyrene is significantly higher than that of styrene. One advantage of the use of metallocene catalyst in α-olefin and p-methylstyrene copolymerization reaction is that its reactivity is very similar to that of α-olefin over a broad range of polymerization conditions. Therefore, substantially truly random copolymers are produced with the polymer composition being essentially the same as feed composition. Furthermore, copolymer molecular weight is almost independent on the concentration of p-methylstyrene. The use of p-methylstyrene as a comonomer with α-olefin thus permits high molecular weight copolymers to be produced, at high conversion of both monomers.

Suitable metallocene catalysts shah have a delocalized π-bonded moiety with a constrained geometry. The catalysts may be further described as a metal coordination complex comprising a metal of groups IVB-VIB of the Periodic Table of the elements and a delocalized π-bonded moiety with a constrained geometry, some of them have been taught in U.S. Pat. Nos. 4,542,199; 4,530,914; 4,665,047; 4,752,597; 5,026,798 and 5,272,236. Preferred catalyst complexes include Zirconocene and Titanocene coordination compounds with single or double cyclopentadienyl derivatives which form the constrained ligand geometry. The catalyst further comprises an activating cocatalyst which usually is a Bronsted acid salt with noncoordinating anion. The amount of such catalysts employed will depend on the desired molecular weight and the desired molecular weight distribution of the copolymer being produced, but will generally range from about 20 ppm to 1 wt. %, and preferably from about 0.001 to 0.2 wt. %, based upon the total amount of monomer to be polymerized therein.

Suitable diluents for the monomers, catalyst components and polymeric reaction products include the general group of aliphatic and aromatic hydrocarbons, used singly or in a mixture, such as propane, butane, pentane, cyclopentane, hexane, toluene, heptane, isooctane, etc.. The processes of the present invention can be carried out in the form of a slurry of polymer formed in the diluents employed, or as a homogeneous solution process, depending on the α-olefin used. The use of a slurry process is, however, preferred, since in that case lower viscosity mixtures are produced in the reactor, and slurry concentrations off up to 40 wt. % of polymer are possible. At higher slurry concentrations it is possible to operate a more efficient process in which it is necessary to recycle less of the reactants and diluent for each unit off polymer produced.

In general, the polymerization reactions of the present invention are carried out by mixing p-methylstyrene and α-olefin (ethylene and propylene with constant pressure) in the presence of the catalyst and diluent in a copolymerization reactor, with thorough mixing, and under copolymerization conditions, including a means to control reaction temperature between 0° to 65 °C. In particular, the polymerization may be carried out under batch conditions, such as in an inert gas atmosphere and the substantial absence of moisture. Preferably the polymerization is carried out continuously in a typical continuous polymerization process with inlet pipes for monomers, catalysts and diluents, temperature sensing means and an effluent overflow to a holding drum or quench tank. The overall residence time can vary, depending upon, e.g., catalyst activity and concentration, monomer concentration, reaction temperature, monomer conversion and desired molecular weight, and generally will be between about thirty minutes and five hours, and preferably between about 1 and 2 hours.

One major advantage of the α-olefin and p-alkylstyrene copolymers (I) is the versatility of benzylic protons in p-alkylstyrene unit which can be selectively converted to various functional groups, such as —COOH, —OH, —NH$_2$, —C$_1$, —Br, —M, —COOM (M=metals, e.g. Li. Na, K and Ca) etc., under mild reaction conditions. The general functionalized copolymers of α-olefin and p-alkylstyrene is illustrated below, in which the copolymer has a substantially homogeneous compositional distribution.

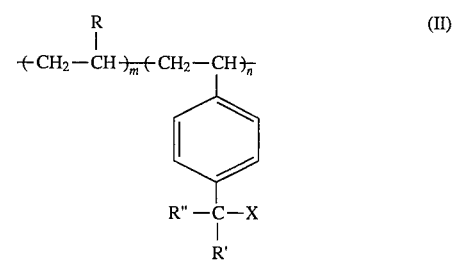

in which R, R' and R" are, independently, either hydrogen, alkyl, or primary or secondary alkyls. Preferably, R is hydrogen and C$_1$ to C$_{10}$ linear and branched alkyl, and most preferably R is hydrogen, C$_1$ and C$_2$. R' and R" are hydrogen, C$_1$ to C$_5$ alkyl, or C$_1$ to C$_5$ primary or secondary alkyl, and most preferably R' and R" are hydrogen. X comprises a functional group, such as —COOH, —OH, —NH$_2$, —Cl, —Br, —M, —COOM (M=metals, e.g. Li, Na, K and Ca) etc., or a mixture of functional group and hydrogen. Preferably these halogenated copolymers are otherwise substantially free of any additional functional group on the polymer backbone chain (i.e., on the α-olefin carbons). In a highly preferred embodiment the halogen is bromide. The α-olefin mole % (m) is between about 5 and 99.9. Preferably, m is between 85 and 99.9, and most preferably m is between 95 and 99.9. The sum of m and n (mole % of p-alkylstyrene) is 100. The copolymer having a number average molecular weight (Mn) of at least about 1,000, and preferably at least about 10,000. The copolymers also preferably have a ratio of weight average molecular weight (Mw) to number average molecular weight, or Mw/Mn of less than about 8, more preferably less than about 4, most preferably less than about 2.5.

All functionality introducing reactions in α-olefin/p-alkylstyrene copolymers are post-polymerization chemical modification processes which can be run on bulk recovered polymer, and can also be run on polymer solution (homogeneous or in a finely dispersed slurry) after suitable quenching and removal off residual monomers. Most functionalization reactions of benzylic protons in both organic compounds and poly(p-alkylstyrene), known in the prior arts can be applied to α-olefin/p-alkylstyrene copolymers with some modifications to enhance the mixing of reagents. Usually, bulk reactions can be effected in an extruder, or other internal mixer, suitably modified to provide adequate mixing. It has the advantages of permitting complete removal of residual unreacted p-methylstyrene by conventional finishing operations prior to chemical modifications, and of avoiding possible diluent reactions to produce undesired side products. The details of such bulk processes are set forth in U.S. Pat. No. 4,548,995, which is incorporated herein by reference thereto. Solution processes are advantageous in that they permit good mixing and control of modification conditions to be achieved, easier removal of undesired by-products. Its disadvantages include the need for removal of residual unreacted para-methylstyrene prior to chemical modification reactions.

The following equation, involving (but not limited) to oxidation, halogenation and metallation reactions of poly(α- olefin-co-p-methylstyrene), is used to illustrated the functionalization reactions of benzylic protons in the copolymers of α-olefin and p-alkylstyrene.

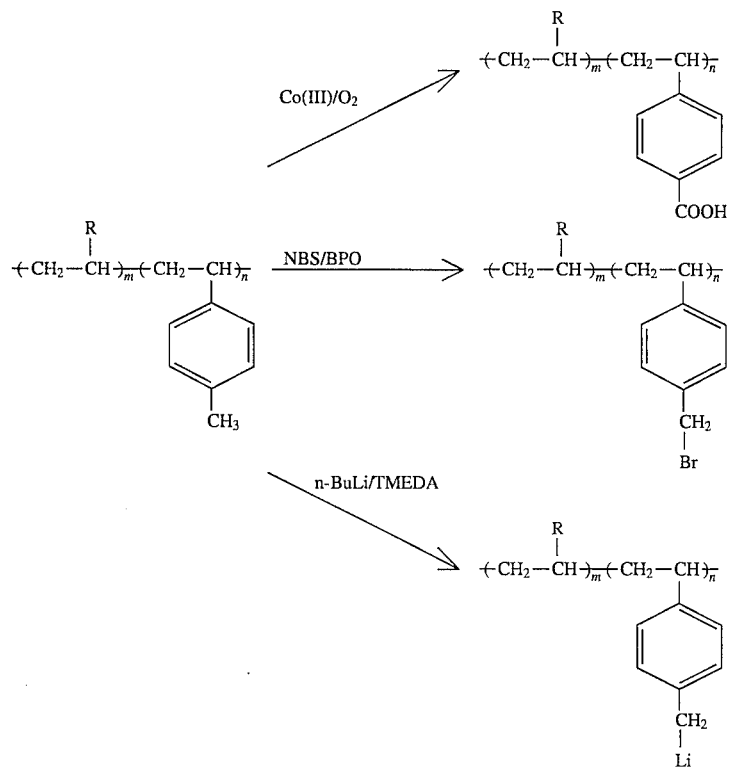

In the above equation, R is either hydrogen, alkyl, or primary or secondary alkyls. Preferably, R is hydrogen and $C_1$ to $C_{10}$ linear and branched alkyl, and most preferably R is hydrogen, $C_1$ and $C_2$. The α-olefin mole % (m) is between about 5 and 99.9. Preferably, m is between 85 and 99.9, and most preferably m is between 95 and 99.9. The sum of m and n (mole % of p-alkylstyrene) is 100. The copolymer having a number average molecular weight (Mn) of at least about 1,000, and preferably at least about 10,000. The copolymers also preferably have a ratio of weight average molecular weight (Mw) to number average molecular weight, or Mw/Mn of less than about 8, more preferably less than about 4, most preferably less than about 2.5.

An example of a post-polymerization chemical modification reaction is halogenation (e.g., radical bromination) to produce the very versatile benzylic halogen-functional copolymers described herein. The surprising ease and highly selective nature of radical halogenation to introduce a benzylic halogen, and the great versatility of the benzylic halogen, makes this a most preferred modification reaction. The halogenation reactions are carded out on the p-methylstyrene/α-olefin copolymers with direct halogenation, and most preferably radical halogenation, being the preferred reaction. It is generally desirable to treat the polymerization copolymer product in an appropriate manner, prior to such halogenation, in order to quench residual unconverted monomers, and put it into a convenient form for the halogenation reaction.

Residual unconverted monomers left in the copolymer will react during halogenation to both consume halogen and produce generally undesirable by-products, and their presence thus renders it difficult to control and measure the amount of desired functionality introduced into the copolymer. Except in cases where the copolymer has been polymerized at very high conversion, it is usually necessary to remove these residual monomers. Unreacted α-olefin (ethylene, propylene, 1-butene) is volatile enough to be easily removed in any of a variety of stripping operations, but p-methylstyrene, with its high boiling point of 170° C., is much more difficult to remove. It is therefore advantageous to polymerize at very high p-methylstyrene conversion levels so that its removal and/or recycle becomes unnecessary or, at least involves smaller amounts of material.

The halogenation reaction itself can be carried out in the bulk phase or on copolymer either in solution (homogeneous or in a finely dispersed slurry). Bulk halogenation can be effected in an extruder, or other internal mixer, suitably modified to provide adequate mixing. It has the advantages of permitting complete removal of residual unreacted p-methylstyrene by conventional finishing operations prior to halogenation, and of avoiding possible diluent halogenation as an undesired side reaction. Solution halogenation is advantageous in that it permits good mixing and control of halogenation conditions to be achieved, easier removal of undesired halogenation by-products, and a wider range of initiators of halogenation to be employed. Its disadvantages include the need for removal of residual unreacted p-methylstyrene prior to halogenation, the presence of complicating side reactions involving solvent halogenation, and a solution step if a non-solution polymerization process is used to prepare the copolymer, as well as removal, clean-up and recycle of the solvent. Suitable solvents for such halogenation include the low boiling hydrocarbons ($C_4$ to $C_7$) and halogenated hydrocarbons. The halogenation can be effectively conducted with the copolymer (such as PE and PP copolymers with high crystallinities) as a fine slurry in a suitable diluent, due to the high surface area of p-methylstyrene units located in the amorphous phases. There is advantageous from a viscosity viewpoint and allows, high solids content during halogenation, but it does require that the slurry or suspension be stable with little tendency to agglomerate or plate out on reactor surfaces. Since the high boiling point p-methylstyrene makes its removal by conventional distillation impractical, and since it is very important where solution halogenation is to be used that the diluent and halogenation conditions be chosen to avoid diluent halogenation, and that residual p-methylstyrene has been reduced to an acceptable level.

When halogenation of the p-methylstyrene/α-olefin copolymers hereof is carried out without using the specified selected reaction conditions, catalysts, reagents and initiators hereof, it tends to either not occur at all, or to proceeds by various routes, so as to produce a variety of halogenated products. Thus, if chlorine or bromine is added to a solution of p-methylstyrene/α-olefin copolymer in a low dielectric constant hydrocarbon solvent, such as hexane or cyclohexane, in the dark at 30°–60° C. for about five minutes, essentially no reaction occurs. On the other hand, if the chlorination reaction is run in a more polar (higher dielectric constant) diluent, such as methylene chloride, then chlorination does occur, but apparently by many different routes, so that a variety of different chlorinated products are produced thereby. These include some of the highly desirable primary benzylic chlorine resulting from substitution on the ring methyl group, but a major amount of less desirable chlorinated products.

It has rather surprisingly been found, however, that radical bromination of the enchained para-methyl styryl moiety in the copolymers of this invention can be made highly specific with almost exclusive substitution occurring on the para-methyl group, to yield the desired benzylic bromine functionality. The high specificity of the bromination reaction can thus be maintained over a broad range of reaction conditions, provided, however, that factors which would promote the ionic reaction route are avoided (i.e., polar diluents, Friedel-Crafts catalysts, etc.). Thus, solutions of the p-methylstyrene/α-olefin copolymers of this invention in hydrocarbon solvents such as pentane, hexane or heptane can be selectively brominated using light, heat, or selected radical initiators (according to conditions, i.e., a particular radical initiator must be selected which has an appropriate half-life for the particular temperature conditions being utilized, with generally longer half-lives preferred at warmer temperatures) as promoters of radical halogenation, to yield almost exclusively the desired benzylic bromine functionality, via substitution on the para-methyl group, and without appreciable chain scisson and/or theory, it is believed that the bromination reaction proceeds by means of a rapid radical chain reaction with the chain carrier being, alternatively, a bromine atom and a benzylic radical resulting from hydrogen atom abstraction from a para-methyl group on the enchained para-methyl styryl moiety.

This reaction can be initiated by formation of a bromine atom, either photochemically or thermally (with or without the use of sensitizers), or the radical initiator used can be one which preferentially reacts with a bromine molecule rather than one which reacts indiscriminately with bromine atoms, or with the solvent or polymer (i.e., via hydrogen abstraction). The sensitizers referred to are those photochemical sensitizers which will themselves absorb lower energy photons and disassociate, thus causing, in turn, disassociation of the bromine, including materials such as iodine. It is thus preferred to utilize an initiator which has a half life of between about 0.5 and 2500 minutes under the desired reaction conditions, more preferably about 10 to 300 minutes. The amount of initiator employed will usually vary between 0.02 and 1% by weight on the copolymer, preferably between about 0.02 and 0.3%. The preferred initiators are benzoyl peroxide, bis azo compounds, such as azobisisobutyronitrile, azobis(2-methylbutyronitrile), and the like. Other radical initiators can also be used, but it is preferred to use a radical initiator which is relatively poor at hydrogen abstraction, so that it reacts preferentially with the bromine molecules to form bromine atoms rather than with the copolymer or solvent to form alkyl radicals. In those cases, there would then tend to be resultant copolymer molecular weight loss, and promotion of undesirable side reactions, such as cross-linking. The radical bromination reaction of this invention is highly selective, and almost exclusively produces the desired benzylic bromine functionality. Indeed, the only major side reaction which appears to occur is disubstitution at the para-methyl group, to yield the more than about 60% of the enchained para-methylstyryl moieties have been monosubstituted. Hence, any desired amount off benzylic bromine functionality in the monobromo form can be introduced into the copolymers of this invention, up to about 60 mole % of the p-methylstyrene content. Furthermore, since the p-methylstyrene content can be varied over a wide range as described herein, it is possible to therefore introduce a significant functionality range. The halogenated copolymers of this invention are thus highly useful in subsequent reactions, for example cross-linking reactions.

Since one mole of HBr is produced for each mole of bromine reacted with or substituted on the enchained para-methylstyryl moiety, it is also desirable to neutralize or otherwise remove this HBr during the reaction, or at least during polymer recovery, in order to prevent it from becoming involved in or catalyzing undesirable side reactions. Such neutralization and removal can be accomplished with a post-reaction caustic wash, generally using a molar excess of caustic on the HBr. Alternatively, neutralization can be accomplished using a material which is reactive with bromine, such as calcium carbonate powder present in dispersed form during the bromination reaction to absorb the HBr as it is produced. Removal of the HBr can also be accomplished by stripping with an inert gas (e.g., $N_2$) preferably at elevated temperatures.

In particular, since little if any tertiary benzylic bromine is produced in the copolymer molecule, the potential dehydrohalogenation reaction will be almost entirely eliminated therein. In addition, presence of the bromine on the ring-methyl group leads to several additional significant advantages with respect to this product. Firstly, it permits functionalization by substitution of other functional groups at that site. More particularly, the highly reactive nature of the halogen in the halomethyl group attached to an aromatic ring makes it a particularly desirable functionality to enhance and extend the usefulness of these copolymers in a range of applications. The presence of aromatic halomethyl groups in the copolymer permits cross-linking in a variety of ways under mild conditions.

The following examples are illustrative of the invention.

EXAMPLE 1

Synthesis of Poly(ethylene-co-p-methylstyrene)

In an argon filled dry-box, 100 ml of toluene, 1.5 g (7.5 mmol in Al) methylaluminoxane (MAO) 30 wt % in toluene) and 2.10 g (17.4 mmol) p-methylstyrene were placed into a Parr 450 ml stainless autoclave equipped with a mechanical stirrer. The sealed reactor was then moved out from the dry box and purged with ethylene gas and the solution was saturated with 45 psi ethylene as at 30° C., the catalyst solution of 2.09 mg (5.0 umol) of Et(Ind)$_2$ZrCl$_2$ in 2 ml of toluene was added under ethylene pressure to initiate the polymerization. Additional ethylene was fed continuously into the reactor to maintain a constant pressure of 45 psi during the whole course of the polymerization. After 60 min, the reaction was terminated by addition of 100 ml of dilute HCl solution in MeOH, the polymer was isolated by filtering and washed completely with MeOH and dried under vacuum at 50° C. for 8 hrs. About 3.85 g of copolymer with 1.67 mol % of p-methylstyrene (Tm=125.6° C., Mw=151, 800 and Mw/Mn=: 2.41) was obtained.

EXAMPLES 2–9

Synthesis of Poly(ethylene-co-p-methylstyrene)

In a series of Examples, high molecular weight of ethylene/p-methylstyrene copolymers were prepared by batch slurry polymerization in a Parr 450 ml stainless autoclave equipped with a mechanical stirrer. The similar reaction procedures described in Example 1 were carded out with the designed reaction conditions (catalyst, solvent, monomer feeds and reaction time and temperature) as indicated in Table I. In all copolymerization reactions, Et(Ind)$_2$ZrCl$_2$/MAO catalyst was used with 100 ml of solvent, either toluene or hexane. Various reaction temperature and time were examined to understand the effects to the catalyst activity and copolymer composition. The copolymerization reactions were terminated by adding 100 ml of dilute HCl solution in MeOH. The polymers were isolated by filtering and washed completely with MeOH and dried under vacuum at 50° C. for 8 hrs. The composition, molecular weight (with molecular weight distribution) of copolymer were determinated by high temperature $^1$H NMR and gel permeation chromatography (GPC), respectively. The crystallinity (Tm: melting point and H: heat of fusion) was measured by differential scanning calorimetry (DSC).

The results obtained are set forth in Table I.

space for comonomer insertion in Et(Ind)$_2$ZrCl$_2$ catalyst provides favorable condition for the insertion of p-alkylstyrene. In fact, the reactivity of p-methylstyrene is significantly higher than that of styrene (will be shown in Examples 10 and 11). From the comparison of homopolymerization of ethylene (control reaction) and copolymerization reactions of ethylene/p-methylstyrene (Examples 2–4), the copolymerization activity slightly increases with the increase of p-methylstyrene. It is unexpected to see the solvent effect which shows significant difference between hexane and toluene. Hexane solvent (Examples 7–9) seems provide higher catalyst activity and p-methylstyrene convertion. The relatively sharp and uniform GPC and DSC curves for all copolymers demonstrate narrow molecular weight distributions and substantially homogeneous compositional distributions or compositional uniformity over the entire range of compositions thereof.

EXAMPLE 10

Synthesis of Poly(ethylene-co-styrene)

The similar reaction conditions described in Example 1 were carded out in the copolymerization reaction of ethylene and styrene. To a Parr 450 ml stainless autoclave equipped with a mechanical stirrer, 100 ml of toluene, 1.5 g (7.5 mmol in Al) methylaluminoxane (MAO) (30 wt % in toluene) and 7.2 g (68.2 mmol) of styrene were charged. The sealed reactor was then saturated with 45 psi ethylene gas at 30° C. before adding catalyst solution, 2.09 mg( 5.0 umol) of Et(Ind)$_2$ZrCl$_2$ in 2 ml of toluene, to initiate the polymerization. Additional ethylene was fed continuously into the reactor by maintaining a constant pressure of 45 psi during the whole course of the polymerization. After 60 min, the reaction was terminated by adding 100 ml of dilute HCl solution in MeOH The polymer was isolated by filtering and washed completely with MeOH and dried under vacuum at

TABLE 1

A summary of the copolymerization reactions between ethylene (E) (m$_1$) and para-methylstyrene(pMS) (m$_2$) with Et(Ind)$_2$ZrCl$_2$/MAO catalysts.

| Expt. No. | cat. μmol | solvent* ml | Tp °C. | m$_1$/psi | m$_2$/10$^{-2}$ mol | tp min | Yield g | activity X10$^{-5}$** | [M$_2$] mol % | conversion wt % | Tm °C. | ΔH J/g | M$_w$ x 10$^{-3}$ | M$_w$/M$_n$ |
|---|---|---|---|---|---|---|---|---|---|---|---|---|---|---|
| control | 5.0 | T/100 | 30 | E/45 | 0 | 60 | 3.22 | 6.44 | 0 | / | 136.8 | 148.7 | 250.4 | 3.67 |
| 1 | 5.0 | T/100 | 30 | E/45 | pMS/1.74 | 60 | 3.85 | 7.70 | 1.67 | 12.5 | 125.6 | 112.7 | 151.8 | 2.41 |
| 2 | 5.0 | T/100 | 30 | E/45 | pMS/3.43 | 60 | 3.78 | 7.56 | 2.98 | 10.8 | 122.6 | 93.9 | 151.5 | 2.25 |
| 3 | 5.0 | T/100 | 30 | E/45 | pMS/6.82 | 60 | 4.39 | 8.78 | 7.04 | 13.1 | 120.0 | 84.0 | 137.6 | 2.14 |
| 4 | 12.5 | T/100 | 30 | E/45 | pMS/6.80 | 120 | 8.62 | 3.45 | 12.46 | 40.4 | 112.3 | 66.9 | 77.00 | 2.03 |
| 5 | 5.0 | T/100 | 50 | E/45 | pMS/3.43 | 60 | 4.48 | 8.96 | 4.28 | 17.5 | 121.6 | 102.1 | 100.0 | 2.47 |
| 6 | 17.0 | T/100 | 50 | E/14.5 | pMS/3.39 | 60 | 9.40 | 5.53 | 4.54 | 39.2 | 118.4 | 75.6 | — | — |
| 7 | 5.0 | H/100 | 30 | E/45 | pMS/3.39 | 60 | 5.58 | 11.20 | 1.65 | 9.21 | 116.1 | 81.9 | — | — |
| 8 | 17.0 | H/100 | 50 | E/45 | pMS/3.43 | 60 | 24.50 | 14.40 | 2.44 | 57.7 | 113.9 | 74.5 | 92.90 | 3.19 |
| 9 | 17.0 | H/100 | 50 | E/45 | pMS/3.39 | 120 | 31.00 | 9.12 | 2.76 | 82.8 | 113.8 | 71.5 | — | — |
| 10 | 5.0 | T/100 | 30 | E/45 | ST/6.82 | 60 | 3.39 | 6.78 | 0.91 | 1.75 | 123.8 | 100.5 | 80.80 | 2.45 |
| 11 | 17.0 | H/100 | 50 | E/45 | ST/3.51 | 60 | 20.42 | 12.01 | 2.20 | 43.1 | 116.5 | 87.5 | — | — |

*Solvents: T (toluene), H (n-hexane)
**g polmer/mol Zr.h

In general, the incorporation of p-methylstyrene in polyethylene was very effective by using Et(Ind)$_2$ZrCl$_2$/MAO catalyst. More than 80 mole % p-methylstyrene convertion was achieved in 2 hours re:action time. The cationic nature of active site and constrained ligand geometry with opened 50° C. for 8 hrs. About 3.39 g of poly(ethylene-co-styrene) with 0.91 mol % of styrene (Tm=123.8° C., Mw=80,800 and Mw/Mn=2.45) was obtained. The conversion of the styrene was only 1.75%, which is very low comparing with the p-methylstyrene cases in the similar reaction conditions.

EXAMPLE 11

Synthesis of Poly(ethylene-co-styrene)

The similar reaction conditions described in Example 10 were carried out for the copolymerization reaction of ethylene and styrene, excepting 35.1 mmol of styrene and 100 ml of hexane were used as comonomer and solvent, respectively. About 20.42 g of PE copolymer with 2.20 mol % of styrene (Tm=116.5° C.) was obtained. The conversion of the styrenic was 43.14%. A big solvent effect was very unexpected. However, the overall incorporation of styrene is still significantly lower than that of p-methylstyrene.

EXAMPLE 12

Synthesis of Poly(ethylene-co-p-methylstyrene)

In an argon filled dry-box, 100 ml of toluene, 2.0 g of AlEt$_3$ solution (0.784 mmol/g in toluene) and 4.0 g (34.3 mmol) p-methylstyrene were placed into a Parr 450 ml stainless autoclave equipped with a mechanical stirrer. The sealed reactor was then moved out from the dry box and purged with ethylene gas. After the solution was saturated with 45 psi ethylene gas at 50° C., 50 mg (17.4 umol Ti) of MgCl$_2$/ED/TiCl$_4$ catalyst slurry in 5 ml of toluene was added under ethylene pressure to initiate the polymerization. Additional ethylene was fed continuously into the reactor to maintain a constant pressure of 45 psi during the whole course of the polymerization. After 60 min., the reaction was terminated by adding 100 ml of dilute HCl solution in MeOH. The polymer was isolated by filtering and washed completely with MeOH and dried under vacuum at 50° C. for 8 hrs. About 17.95 g copolymer with 0.24 mol % of p-methylstyrene (Tm=134.4° C., Mw=214,200 and Mw/Mn =6.06) was obtained. The conversion of the p-methylstyrene was 4.5%.

EXAMPLE 13

Synthesis of Poly(ethylene-co-p-methylstyrene)

The similar reaction conditions described in Example 12 were carded out for the polymerization except that 8.0 g (68.2 mmol) of p-methylstyrene was used as comonomer. About 22.11 g of PE copolymer with 0.44 mol % of p-methylstyrene (Tm=134.0° C., Mw =125,700 and Mw/Mn=5.47) was obtained. The conversion of the p-methylstyrene was 5.02%.

EXAMPLE 14

Synthesis of Poly(propylene-co-p-methylstyrene)

In an argon filled dry-box, 100 ml of toluene, 2.0g of AlEt$_3$ solution (0.784 mmol/g in toluene), 0.22 g of dimethoxylmethylphenylsilane solution (0.5 mmol/g in toluene) and 4.0 g (34.3 mmol) p-methylstyrene were placed into a Parr 450 ml stainless autoclave equipped with a mechanical stirrer. The sealed reactor was then moved out from the dry box and purged with propylene gas and the solution was saturated with 29 psi propylene gas at 50° C. 50 mg (17.4 umol Ti) of MgCl$_2$/ED/TiCl$_4$ catalyst slurry in 5 ml of toluene was added under propylene pressure to initiate the polymerization. Additional propylene was fed continuously into the reactor to maintain a constant pressure of 29 psi during the whole course of the polymerization. After 60 min, the reaction was terminated by adding 100 ml of dilute HCl solution in MeOH. The polymer was isolated by filtering and washed completely with MeOH and dried under vacuum at 50° C. for 8 hrs. About 22.40 g of PP copolymer with 0.36 mol % of p-methylstyrene (Tm=152.9 ° C., Mw=168,200 and Mw/Mn=5.54) was obtained. The conversion of the p-methylstyrene was 5.63%.

EXAMPLE 15

Synthesis of Poly(propylene-co-p-methylstyrene)

The similar reaction conditions described in Example 14 were carded out for the polymerization except that 8.0 g (68.2 mmol) of p-methylstyrene was used as comonomer. About 22.60 g of PP copolymer with 0.48 mol % of p-methylstyrene (Tm=154.3° C., Mw=202,200 and Mw/Mn=6.23) was obtained. The conversion of the p-methylstyrene was 3.73%.

EXAMPLE 16

Oxidation Reaction of Poly(ethylene-co-p-methylstyrene)

About 1.0 g of copolymer obtained from Example 3 was added to the glass flask containing 75 ml of phenylchloride and 25 ml of acetic acid mixture together with 0.12 g of cobalt (III) acetate tetrahydrate and 0.21 g of sodium bromide. The suspension mixture was heated to 105° C. and oxygen bubbled through for 3 hrs. the reaction was then terminated with MeOH, washed with MeOH, water and acetone and dried under vacuum at 50° C. for 24 hrs. About 0.90 g polymer was obtained. Both —CHO and —COOH groups were observed by $^1$H NMR spectrum. A DSC curve of functionalized polymer shows a sharp peak with the melting point at 126.6° C. (6.6° C. higher than that of ethylene/p-methylstyrene copolymer before oxidation). This functionalized polymer is completely soluble in p-xylene and trichlorobenzene (TCB) at high temperature.

EXAMPLE 17

Chlorination Reaction of Poly(ethylene-co-p-methylstyrene)

About 0.5 g of poly(ethylene-co-p-methylstyrene) obtained from Example 2 was swelled in 20 ml of a chloroform/dichloromethane (1/1) mixed solvents. After adding 90 ml of sodium hypochlorite solution (>4.0% Cl available), the PH of the solution was adjusted to a value in the range of 8.0–9.0 by using concentrated hydrochloric acid. Benzyltriethyliammonium chloride (0.196 g) was then added to the mixtures. The suspended solution was then stirred vigorously for 23 hrs under N$_2$ atmosphere. The polymer was isolated by filtering, washing with methanol, water, dichloromethane/methanol, methanol, and dried under vacuum at 50° C. for 24 hrs. About 0.60 g polymer was obtained. The CH$_2$Cl groups in copolymer were observed in $^1$H NMR spectrum. A DSC curve of functionalized polymer shows a sharp peak with the melting point at 117.1° C. (5.5° C. lower than that of copolymer before chlorination). This functionalized polymer is completely soluble in p-xylene and trichlorobenzene (TCB) at high temperature.

EXAMPLE 18

Bromination Reaction of Poly(ethylene-co-p-methylstyrene)

About 1.0 g of copolymer obtained from Example 2 was swelled in 100 ml of anhydrous carbon tetrachloride solution. Under the dark, 1.60 g of N-bromosuccinimide (NBS) and 0.06 g of benzoyl (BPO) peroxide, were added to the mixture. The bromination reaction was carried out at the boiling point of the solvent for 2 hrs under nitrogen atmosphere before the termination by methanol. The polymer was isolated by filtering, washing with methanol, water, acetone, and dried under vacuum at 50° C. for 24 hrs. About 1.31 g brominated polymer was obtained. From $^1$H NMR studies, all para-$CH_3$ groups were brominated to —$CH_2Br$ groups. A DSC curve of functionalized polymer shows a sharp peak with the melting point at 118.9° C. (3.7° C. lower than that of copolymer before bromination). This functionalized polymer is completely soluble in p-xylene and TCB at high temperature.

EXAMPLE 19

Bromination Reaction of Poly(propylene-co-p-methylstyrene)

About 1.0 g of poly(propylene-co-p-methylstyrene) obtained from Example 15 was swelled in 100 ml of anhydrous carbon tetrachloride solution. Under the dark, 0.30 g of N-bromosuccinimide and 0.01 g of benzoyl peroxide were added to the mixture. The bromination reaction was carried out at the boiling point of the solvent for 3 hrs under nitrogen atmosphere before the termination by methanol. The polymer was isolated by filtering, washing with methanol, water, acetone, and dried under vacuum at 50° C. for 24 hrs. About 1.05 g brominated polymer was obtained. From $^1$H NMR studies, it was determined that all para-$CH_3$ groups were brominated to —$CH_2Br$ groups. This functionalized polymer is completely soluble in TCB at high temperature.

EXAMPLE 20

Metallation and Carboxylation Reactions of Poly(ethylene-co-p-methylstyrene)

In an argon filled dry box, 2.0 g of poly(ethylene-co-p-methylstyrene) obtained from Example 4 was swelled in 50 ml of benzene. The metallation reaction was started by adding 1.51 ml (10.0 mmol) of tetramethylethylenediamine and 2.0 ml (5.0 mmol) of n-BuLi solution (2.5M in hexane). To ensure the complete reaction, the solution was heated to 50° C. and stirred for 15 hrs.under nitrogen atmosphere. The reaction mixture was then cooled to room temperature before adding 100 ml of dry THF saturated by $CO_2$. The bubbling of $CO_2$ through the solution was continued for 1 hr. After an additional hour of stirring, the reaction was terminated by adding methanol HCl solution. The polymer was isolated by the polymer was then washed with methanol, water and acetone, and dried under vacuum at 50° C. for 24 hours. About 1.90 g polymer was obtained. IR measurements show strong absorption of carboxylic acid in the resulting copolymer.

What is claimed is:

1. Copolymers having been prepared in the presence of a metallocene catalyst and having a substantially homogeneous compositional distribution represented by the formula:

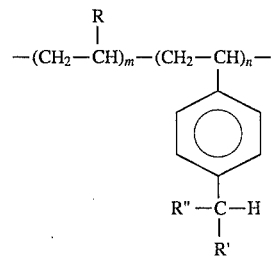

wherein R is hydrogen or $C_1$ to $C_{10}$ linear or branched alkyl, and R' and R" are, independently, hydrogen or $C_1$ to $C_5$ primary or secondary alkyl; wherein the alpha α-olefin mole % (m) is between about 5 and 99.9, wherein the sum of m and n (mole % p-alkylstyrene) is 100; and wherein the copolymers have a number average molecular weight (Mn) of at least about 1,000 and a ratio of weight average molecular weight (Mw) to number average molecular weight of less than about 4.

2. Copolymers of claim 1 wherein R is hydrogen, $C_1$ alkyl or $C_2$ alkyl.

3. Copolymers of claim 1 wherein R' and R" are hydrogen or $C_1$ to $C_5$ primary or secondary alkyl.

4. Copolymers of claim 2 wherein R' and R" are hydrogen.

5. Copolymers of claim 1 wherein R, R' and R" are hydrogen, said copolymers having a number average molecular weight (Mn) of at least about 10,000 and an α-olefin mole% (m) above 15.

* * * * *